Patented June 7, 1949

2,472,672

UNITED STATES PATENT OFFICE 2,472,672

VINYL SULFONE-DIENE INTERPOLYMERS

Charles J. Mighton, Christiana Hundred, Del., assignor to E. I. du Pont de Nemours & Company, Wilmington, Del., a corporation of Delaware No Drawing. Application May 16, 1945,
Serial No. 594,179

10 Claims. (Cl. 260—86.5)

This invention relates to polymeric products, and more particularly to a new class of polyvinyl sulfones.

Although monovinyl sulfones are old in the art, their polymers have not previously been described. In fact, certain members of this class have been described as non-polymerizable.

This invention has as an object the provision of a new and valuable class of polymeric materials. A further object is to provide homopolymers of monovinyl sulfones, and interpolymers of these sulfones with other polymerizable vinyl and vinylidene compounds, including 1,3-dienes. A still further object is to obtain oil-resistant, rubber-like polymers that may be used for the fabrication of gaskets, belts and other mechanical goods that must withstand the deleterious effects of kerosene and other oils and at the same time retain rubbery properties at low temperatures. A still further object is to prepare new plastic polymers suitable for use as fibers, films or molded articles. A still further object is to provide polymers of value in coating compositions. Still another object is to provide polymers of value in plastics. Additional objects will become apparent from an examination of the following description and claims.

These and other objects and advantages are accomplished according to the herein-described invention which broadly comprises a monovinyl sulfone polymer had by polymerizing a polymerizable composition containing a monovinyl sulfone having the general formula $$RSO_2CH=CH_2$$

wherein R is a monovalent hydrocarbon radical of the group consisting of monovalent aromatic and aliphatic, including cycloaliphatic, radicals.

In a more restricted embodiment this invention comprises a monovinyl sulfone homopolymer had by polymerizing, in the absence of another polymerizable compound, a monovinyl sulfone having the general formula $RSO_2CH=CH_2$ wherein R is a monovalent hydrocarbon radical of the group consisting of monovalent aromatic and aliphatic, including cycloaliphatic, hydrocarbon radicals containing not more than eight carbon atoms.

In another more restricted embodiment this invention comprises a monovinyl sulfone interpolymer had by polymerizing a monovinyl sulfone (having the general formula $RSO_2CH=CH_2$, wherein R is a monovalent hydrocarbon radical of the group consisting of monovalent aromatic and aliphatic, including cycloaliphatic, hydrocarbon radicals containing not more than eight carbon atoms) with at least one other polymerizable compound which contains at least one ethylenic linkage.

The process of this invention comprises polymerizing a polymerizable composition containing a monovinyl sulfone in an aqueous system in the presence of a peroxy compound of the group consisting of organic peroxy compounds and water-soluble salts of inorganic peracids.

In a more restricted embodiment this invention comprises polymerizing, in the absence of another polymerizable compound, a monovinyl sulfone having the general formula $$RSO_2CH=CH_2$$

wherein R is a monovalent hydrocarbon radical of the group consisting of monovalent aromatic and aliphatic, including cycloaliphatic, hydrocarbon radicals containing not more than eight carbon atoms, said polymerization being effected in an aqueous system in the presence of a water-soluble salt of an inorganic peracid as catalyst and an oxidizable sulfur compound as catalyst activator.

In another more restricted embodiment this invention comprises interpolymerizing a monovinyl sulfone with at least one other polymerizable compound containing at least one ethylenic linkage, said monovinylsulfone having the general formula $RSO_2CH=CH_2$, wherein R is a monovalent hydrocarbon radical of the group consisting of monovalent aromatic and aliphatic, including cycloaliphatic, hydrocarbon radicals containing not more than eight carbon atoms, said polymerization being effected in an aqueous system in the presence of a water-soluble salt of an inorganic peracid as catalyst and an oxidizable sulfur compound as catalyst activator.

It is to be understood that the term "cycloaliphatic," as employed herein and in the appended claims, is synonymous with the term "alicyclic."

In practice, polymerization of the aforementioned monovinyl sulfones can be effected in an aqueous medium using a peroxy catalyst of the type hereinbefore defined. In a preferred method the vinyl sulfone or a mixture of a vinyl sulfone with another unsaturated polymerizable compound is emulsified in water containing 2 to 5% of an emulsifying agent, 1% of potassium persulfate, 1% of the sodium salt of a sulfonated naphthalene-formaldehyde condensation product, and 0.1% of sodium bisulfite. This emulsion is then agitated for extended periods at elevated temperature, 40°–60° C. being preferred. The polymer is then coagulated by the addition of methanol, saturated sodium chloride solution, or 10% barium chloride solution.

The following examples, in which proportions are in parts by weight unless otherwise specified, are given for illustrative purposes and are not intended to place any restrictions on the herein described invention:

*Example I*

Ten parts of butyl vinyl sulfone are emulsified in a mixture of 20 parts of water, 0.2 part of the sodium salts of the sulfate esters of a mixture of alcohols having an average of 12 carbon atoms, 0.1 part of potassium persulfate, and 0.01 part of sodium bisulfite. The pH of the emulsion is then adjusted to 10.85 with sodium hydroxide. After heating at 40° C. for 60 hours, a soft polymer separates from the emulsion. The yield of dry polymer is 34% of the theory. This polymer is soluble in acetone and dioxane. Clear, light-colored films cast from acetone are initially tacky but on aging they become tack free and hard and show excellent adhesion to glass.

Ten parts of butyl vinyl sulfone emulsified as above but at a pH of 3.85 is heated at 40° C. for 60 hours. A soft light-colored polymer resembling that obtained at the higher pH is obtained in 21% of the theory.

*Example II*

A solution of 10 parts of ethyl vinyl sulfone, 30 parts of water, 0.1 part of potassium persulfate, and 0.01 part of sodium bisulfite is heated at 40° C. for 40 hours. A polymer separates from the solution and a further amount separates on addition of alcohol. The yield of polymer is approximately 50% of the theory. This polymerized ethyl vinyl sulfone is soluble in acetone, dioxane, and hot ethyl alcohol. It is slightly soluble in hot water. A film of polymer cast from an acetone solution is initially tacky but dries to hard, glossy, somewhat brittle product on aging at room temperature.

*Example III*

A mixture of 5 parts of ethyl vinyl sulfone, 5 parts of vinyl acetate, 10 parts of water, 0.2 part of potassium persulfate, 0.2 part of the sodium salt of a sulfonated naphthalene-formaldehyde condensation product, and 0.02 part of sodium bisulfite is heated for 40 hours at 403 C. Methyl alcohol is then added and the solution is evaporated to a small volume. Then ether is added and the solution is again evaporated to a small volume to precipitate the solid interpolymer. The yield of dry interpolymer amounts to 10 parts. The product is soluble in acetone and dioxane, and slightly soluble in alcohol, but is insoluble in ether. This polymer contains 14.65 per cent sulfur and has a saponification number of 277.4 which indicates a composition of 55 per cent of ethyl vinyl sulfone and 45 per cent of vinyl acetate.

A film cast from an acetone solution of this polymer is opaque and somewhat brittle, and has a tensile strength of 525 pounds per square inch and an elongation of 4 per cent.

*Example IV*

A mixture of 5 parts of ethyl vinyl sulfone and 5 parts of dimethyl (vinylethinyl) carbinol is polymerized by the same procedure as that described in Example III. A brown interpolymer is obtained that is insoluble in acetone, dioxane, and ethyl alcohol. When heated this interpolymer changes in color from brown to black. The yield amounts to 83% of the theoretical amount.

*Example V*

A mixture of 15 parts of 2-chloro-1,3-butadiene and 5 parts of butyl vinyl sulfone is emulsified in a solution of 1.2 parts of the sodium salt of the sulfate esters of oleyl acetate, 0.2 part of sodium p-toluenesulfinate, 0.1 part of ammonium persulfate, 0.1 part of the sodium salt of a sulfonated naphthalene-formaldehyde condensation product, 0.13 part of 37 per cent hydrochloric acid and 44.6 parts of water. This emulsion is heated at 40° C. until the specific gravity is constant at 1.047 after which time 1.2 parts of a 25 per cent dispersion of tetraethyl-thiuram-disulfide in water, and 0.8 part of a 25 per cent dispersion of a mixture of 55 per cent phenyl-alpha-naphthylamine and 45 per cent diphenylamine in water are added. The polymer is coagulated by the addition of brine and alcohol and is washed with water for 15 minutes on a rubber mill having a corrugated roll and then dried on a rubber mill having smooth rolls. The yield amounts to 17 parts. This polymer contains 2.87 per cent sulfur, whereas a polymer of 2-chloro-1,3-butadiene prepared in the same manner and treated in the same way contains only 0.98 per cent sulfur. Calculation shows that the interpolymer contains 8.8 per cent of butyl vinyl sulfone.

Compounding of this product with 2 parts of phenyl-alpha-naphthylamine, 36 parts of channel carbon black, 4 parts of extra-light-calcined magnesium oxide and 5 parts of zinc oxide per 100 parts of polymer and curing for 30 minutes at 153° C. results in a vulcanizate having a tensile strength of 1730 p. s. i. and an elongation of 350 per cent. This vulcanizate increases in volume only 52 per cent when immersed in kerosene and heated at 100° C. for two days. A polymer of 2-chloro-1,3-butadiene shows a volume increase in kerosene of about 65 per cent when compounded, cured and tested in the same way.

*Example VI*

A mixture of 10 parts of 1,3-butadiene and 10 parts of butyl vinyl sulfone is emulsified in a solution of 2 parts of a 25 per cent solution of C-cetyl betaine, 0.2 part of the sodium salt of a sulfonated naphthalene-formaldehyde condensation product; 0.2 part of potassium persulfate, 25 parts of water and 0.02 part of potassium ferricyanide and is then heated in a sealed glass reaction vessel at 40° C. for 40 hours with vigorous agitation. To the resulting polymer-containing emulsion is added 1.6 g. of a water dispersion containing 25 per cent by weight of a mixture of phenyl-alpha-naphthylamine (55%) and diphenylamine (45%). The product is coagulated by acidification with acetic acid followed by addition of saturated sodium chloride solution and is washed with water for ten minutes on a rubber mill having a corrugated roll and is then dried on a rubber mill having a smooth roll. The yield amounts to 8.7 parts. Analysis of this product shows the presence of 8.95 per cent sulfur which corresponds to the presence of 41 per cent of interpolymerized butyl vinyl sulfone.

The rubber-like interpolymer is compounded with 2 parts of sulfur, 50 parts of channel carbon black, 2 parts of stearic acid, 5 parts of zinc oxide, and 1.25 parts of 2-mercapto thiazoline per 100 parts of the interpolymer in the standard way on a rubber mill. The compounded interpolymer is vulcanized for 30 minutes at 153° C. and the vulcanizate is found to have a tensile strength of 1930 p. s. i. and an elongation of 350 per cent. This vulcanizate increased in volume by only 45 per cent when heated in kerosene at 100° C. for two days. A polymer of polybutadiene compounded and vulcanized in the same way increases in volume by 250-300 per cent when heated in kerosene at 100° C. for two days. Further, the vulcanizate of the butadiene-butyl vinyl sulfone interpolymer exhibits excellent freeze resistance as indicated by a $T_{10}$ value of −58° C. (The $T_{10}$ value used as a measure of freeze resistance, is obtained as follows: a vulcanizate of uniform cross section is stretched 170% and cooled slowly to −70° C. in this stretched condition. The tension on the sample is then released, the temperature is raised slowly, and the sample allowed to contract freely. The temperature at which the sample shows 10% of the total retraction possible is the $T_{10}$ value. Thus, the lower the $T_{10}$ value the greater is the freeze resistance.)

*Example VII*

A solution of 10 parts of ethyl vinyl sulfone, 10 parts of water and 0.2 part of tert.-butyl hydroperoxide is heated at 40° C. for 40 hours. The polymer separates from the solution as the polymerization proceeds. The yield of polymer is 82% of the theory.

A somewhat lower yield of ethyl vinyl sulfone polymer is obtained when the above experiment is repeated using benzoyl peroxide as the catalyst.

The number and types of monovinyl sulfones which can be polymerized alone or conjointly with other polymerizable compounds containing either a single ethylenic double bond or a conjugated system of double bonds vary within wide limits. These monovinyl sulfones are of the general formula $RSO_2CH=CH_2$, wherein R is a monovalent hydrocarbon radical of the group consisting of monovalent aromatic and aliphatic, including cycloaliphatic, hydrocarbon radicals. Although R may represent for example, long chain alkyl or aryl groups containing up to 18 carbon atoms, those sulfones are preferred in which R contains from one to eight carbon atoms because of their greater ease of polymerization. Preferred monovinyl sulfones include methyl, ethyl, propyl, butyl, isobutyl, amyl, hexyl, octyl, cyclohexyl, benzyl and phenyl vinyl sulfones. The sulfones can be prepared by the oxidation of the corresponding vinyl sulfides in accordance with the process disclosed in U. S. 2,163,180. Another method which has been used for the preparation of ethyl vinyl sulfone and butyl vinyl sulfone consists in the oxidation of the ethyl beta-chloroethyl sulfide and the butyl beta-chloroethyl sulfide with hydrogen peroxide and then dehydrohalogenating the resulting sulfones to the corresponding vinyl sulfones with triethylamine.

Broadly speaking, this invention contemplates the production of valuable high molecular weight polymers obtained by polymerizing a monovinyl sulfone, having the general formula

wherein R is a monovalent hydrocarbon radical of the group consisting of aliphatic, including cycloaliphatic, and aromatic hydrocarbon radicals, or by polymerizing a mixture of said vinyl sulfones, either in the absence of another polymerizable compound or admixed with a polymerizable compound which contains at least one ethylenic linkage. Said polymerizable compound may be the monovinyl sulfone itself, i. e., the monovinyl sulfone may be polymerized in the absence of another polymerizable compound to provide a homopolymer; or, in order to provide an interpolymer, said polymerizable compound may be another monovinyl sulfone or admixture of other monovinyl sulfones or some other polymerizable compound which contains at least one ethylenic linkage or admixture of said compounds.

Polymerizable compounds containing a single ethylenic double bond and which may be used in the preparation of valuable interpolymers with monovinyl sulfones include: vinyl esters of carboxylic acids, such as vinyl acetate, vinyl isobutyrate, vinyl pimelate and vinyl benzoate; the methyl, ethyl, butyl, and higher homologous esters of acrylic, methacrylic, alpha-halogen acrylic, maleic and fumaric acids; also other polymerizable compounds including acrylonitrile, methacrylonitrile, methacrylamide, N-alkyl methacrylamides, N-vinyl imides, N-butyl maleimide, vinyl chloride, vinyl fluoride and vinylidene chloride. The properties of these interpolymers can be varied widely by the nature and proportion of the monovinyl sulfone bound in the interpolymer. Interpolymers containing from 1% to 99% of a monovinyl sulfone are included within the scope of the invention.

In another aspect of this invention, monovinyl sulfones and polymerizable compounds having a conjugated system of ethylenic double bonds are polymerized conjointly to form new rubbery materials. Examples of polymerizable dienes which may be used in various proportions with the monovinyl sulfones are: 1,3-butadiene, isoprene, 2,3-dimethyl-1,3-butadiene, piperylene, 2-chloro-1,3-butadiene, 2-fluoro-1,3-butadiene, 2-chloro-3-methyl-1,3-butadiene, 2-cyano-1,3-butadiene, 2-methoxy-1,3-butadiene, and 2-acetoxy-1,3-butadiene. The resultant interpolymers may be mixed with sulfur, carbon black, metallic oxides and vulcanization accelerators in standard rubber processing equipment and cured to vulcanizates having good oil resistance. Preferred interpolymers are obtained with 1,3-butadiene and 2-chloro-1,3-butadiene. The properties of the resulting rubbers will depend upon the kind and amount of vinyl sulfone used in preparation. For example, a tread-stock vulcanizate of an interpolymer consisting of 88 per cent 1,3-butadiene and 12 per cent of butyl vinyl sulfone exhibits a volume increase in kerosene of 195 per cent, and that of an interpolymer containing 41 per cent butyl vinyl sulfone swells only 45 per cent. Vulcanizates of the butadiene interpolymers are further characterized by excellent low-temperature rubber-like properties. The preferred rubbers are those obtained starting with initial monomer mixtures in which the diene amounts to 85-40% of the total weight and the sulfone 15-60% of the total.

The novel polymers of this invention, i. e. monovinyl sulfone polymers and interpolymers, are macromolecular organic compounds containing a plurality of recurring units, i. e. are high polymers. More specifically said polymers are organic compounds having a degree number, i. e., a degree of polymerization, as defined by Staudinger in Die hochmolekularen organischen Verbindungen (1932), cited by Marvel and Horning in 1 Gilman, Organic Chemistry (2d ed. 1943) 741, of at least 100. A "homopolymer" is a polymer in which said recurring units are the same; while an "interpolymer" is a polymer in which said recurring units are different.

As hereinbefore stated, it is essential that polymerization should be effected in the presence of water. Furthermore, it is essential that the polymerization be effected in the presence of a peroxy compound of the group consisting of organic peroxy compounds and water-soluble salts of inorganic peracids. Included among specific examples of said peroxy compounds are: sodium persulfate, potassium persulfate, benzoyl peroxide, lauroyl peroxide, diethyl peroxide and tert.-butyl-hydroperoxide. While this invention is generic to the use of all organic peroxy compounds and all water-soluble salts of inorganic peracids, markedly improved results are had with the water-soluble salts of inorganic peracids, optimum results being obtained with water-soluble persulfates, e. g., sodium persulfate and potassium persulfate.

The action of the aforementioned peroxy compounds can be markedly improved by the use therewith of an oxidizable sulfur compound, i. e., a water-soluble compound containing both sulfur and oxygen and in which the sulfur has a valence no greater than four, i. e., sulfur dioxide and compounds containing a sulfur-oxygen linkage and yielding sulfur dioxide on treatment with hydrochloric acid. While sodium bisulfite is preferred, other such compounds, e. g., sodium sulfite, ammonium bisulfite, sodium hydrosulfite, sodium thiosulfate, formamidine sulfinic acid, condensation products of aldehydes with alkali metal bisulfites or hydrosulfites and dialkylsulfites may be used. The amount of the oxidizable sulfoxy compound to be added to the reaction mixture may vary from 0.001% to 5% based on the weight of the monomeric reactants. From 0.1% to 2% is the preferred range in view of the superior products obtained therewith.

The polymers of this invention can be prepared in aqueous solution and in aqueous emulsion and by employing the granulation technique as described in U. S. 2,232,515 using peroxy catalysts of the type hereinbefore defined. Outstanding advantages, however, are obtained by employing an aqueous emulsion system comprising an organic peroxy compound or a water-soluble salt of an inorganic peracid as catalyst, an oxidizable sulfur compound as catalyst activator and an emulsifying agent. Among typical emulsifying agents are: sodium oleate, C-cetyl betaine, the sodium salt of the sulfate ester of oleyl acetate, and the sodium sulfate ester of lauryl alcohol, preferred concentrations being within the range of from 2% to 5% of the weight of the monomer.

In conducting the process of polymerizing a monovinyl sulfone, either in the absence of or with another polymerizable compound, any of the methods described above may be employed. The lower aliphatic monovinyl sulfones such as methyl or ethyl vinyl sulfone are water-soluble and may be polymerized conveniently in aqueous solution. Water-insoluble sulfones are best polymerized in aqueous media by the emulsion polymerization technique. In general the catalyst concentration is within the range of from 0.1% to 2% based upon the total weight of monomers used. Although temperatures from about 10° C. to about 100° C. may be employed, the most effective temperatures lie within the range of from 30° C. to 80° C. since at temperatures within said range there are had high molecular weight polymers at relatively rapid rates. Greater polymerization speeds are obtainable at higher temperatures but usually with some sacrifice in the molecular weight. It is usually advantageous to displace the air in the system and in the free space above the mixtures with an inert atmosphere such as nitrogen or carbon dioxide. Polymerization may be carried out at normal, sub- or super-atmospheric pressures. In the solution process, the ratio of monomers to solvent can be varied in accordance with the principle that higher dilutions result in slower rates and produce lower molecular weights. In the emulsion and granulation methods, the ratios of the dispersed phase (mixture of monomers) to water may be varied widely. Convenient and satisfactory amounts of water are within the range of from 100% to about 300% of the dispersed phase. When the granulation method of polymerization is employed, highly effective stirring is essential. For the solution method, stirring is optional. In the emulsion method, the effectiveness of the dispersing agent, especially if small concentrations are employed, may be enhanced by agitation of the mixture.

When two or more polymerizable monomers are interpolymerized, the present invention contemplates the addition of the entire amount of the two or more polymerizable compounds to the aqueous medium followed by subsequent polymerization. The polymerization rates of the monomers operative in this invention may vary to a considerable extent, and it may, therefore, be found in some cases that the products may be characterized by non-homogeneity and other inferior physical properties. Under these conditions, the polymerization process may be modified by mixing initially all of the more slowly polymerizing material, and thereafter adding small portions of the more rapidly polymerizing material at about the rate at which this material is used up.

The isolation of the polymers of this invention will depend upon the method of polymerization employed. When the solution method of polymerization is used, the polymer can be isolated by the method illustrated in Example III or by filtering the precipitated polymer. When the granulation method of polymerization is employed, the only purification required is to filter the product by suitable means, thoroughly wash with distilled water, and dry. When the emulsion method of polymerization is employed, the polymers may be isolated as finely divided powders by a variety of methods. For example, the dispersion may be sprayed into a heated and/or evacuated chamber whereby the water is removed as vapor and the polymer falls to the bottom of the chamber. The product may also be isolated by cooling the dispersion below the freezing point of the aqueous medium or by the addition of a large volume of a lower aliphatic alcohol, such as methanol or ethanol. The most satisfactory method consists in adding an appropriate amount of an electrolyte solution to the diluted aqueous dispersion with rapid agitation at a temperature just below the point at which the precipitated particles tend to cohere. Suitable electrolytes include sodium chloride, sodium sulfate, hydrochloric acid, phosphoric acid, calcium chloride, magnesium sulfate, lead nitrate, lead acetate, stannous chloride and aluminum sulfate. After precipitation of the polymer, it is filtered and washed repeatedly with water to remove traces of electrolytes and dispersing agent which may adhere to the particles.

When polymerizing a monovinyl sulfone or admixture of monovinyl sulfones with another polymerizable compound or admixture of other polymerizable compounds, the ratio of monovinyl sulfone compounds to other polymerizable material may be varied within relatively wide limits. However, the mixture of polymerizable compounds subjected to polymerization should contain at least 1% by weight of a monovinyl sulfone or admixture of monovinyl sulfones. Polymeric products superior for most purposes are had when said mixture contains at least 15% by weight of a monovinyl sulfone or admixture of monovinyl sulfones; while polymeric products having optimum properties result when said mixture contains more than 45% by weight of a monovinyl sulfone or admixture of monovinyl sulfones.

As hereinbefore stated, the ratio by weight of monovinyl sulfone to other polymerizable material in the monovinyl sulfone polymers of this invention is at least 1:99. For most purposes, however, said ratio should be at least 15:85 while monovinyl sulfone polymers having optimum properties are those in which said ratio is greater than 45:55.

The products of this invention may be used in a number of applications. For example, the monovinyl sulfone homopolymers are useful as adhesives and in coating compositions; while interpolymers of monovinylsulfones with other polymerizable compounds have a variety of uses. Interpolymers of monovinylsulfones with other monovinyl compounds are useful as plastics in the fabrication of cast or molded articles of various types, while interpolymers such as those obtained with acrylonitrile are useful in the form of textile fibers. Interpolymers of dienes with monovinylsulfones may be used in places requiring a rubbery material that must withstand the swelling action of oils, e. g. in gaskets, belts and carburetor diaphragms.

As many apparently widely different embodiments of this invention may be made without departing from the spirit and scope thereof, it is to be understood that we do not limit ourselves to the specific embodiments thereof except as defined in the appended claims.

This application is a continuation-in-part of my application Ser. No. 569,422, filed December 22, 1944 and now abandoned.

Having described the present invention, the following is claimed as new and useful:

1. An interpolymer obtained by polymerizing a mixture of from 15 to 60 parts by weight of a monovinylsulfone and from 85 to 40 parts by weight of a polymerizable diene containing conjugated double bonds in the 1,3-position, said monovinylsulfone having the general formula $RSO_2CH=CH_2$, wherein R is a monovalent hydrocarbon radical of the group consisting of monovalent aromatic and aliphatic, including cycloaliphatic, hydrocarbon radicals containing not more than eight carbon atoms, said polymerization being effected in aqueous emulsion in the presence of a water-soluble salt of an inorganic per-acid, an oxidizable sulfur compound, and an emulsifying agent.

2. An interpolymer as set forth in claim 1 wherein the polymerizable compound containing conjugated double bonds is 1,3-butadiene.

3. An interpolymer as defined in claim 1 wherein the polymerizable compound containing conjugated double bonds is 2-chloro-1,3-butadiene.

4. An interpolymer obtained by polymerizing a mixture of from 15 to 60 parts by weight of butylvinylsulfone and from 85 to 40 parts by weight of 1,3-butadiene, said polymerization being effected in aqueous emulsion in the presence of a water-soluble salt of an inorganic per-acid, an oxidizable sulfur compound, and an emulsifying agent.

5. An interpolymer obtained by polymerizing a mixture of from 15 to 60 parts by weight of butylvinylsulfone and from 85 to 40 parts by weight of 2-chloro-1,3-butadiene, said polymerization being effected in aqueous emulsion in the presence of a water-soluble salt of an inorganic per-acid, an oxidizable sulfur compound, and an emulsifying agent.

6. The process for obtaining a monovinylsulfone interpolymer, which comprises polymerizing from 15 to 60 parts by weight of a monovinylsulfone with from 85 to 40 parts by weight of a polymerizable diene containing conjugated double bonds in the 1,3-position, said monovinylsulfone having the general formula $RSO_2CH=CH_2$, wherein R is a monovalent hydrocarbon radical of the group consisting of monovalent aromatic and aliphatic, including cycloaliphatic, hydrocarbon radicals containing not more than eight carbon atoms, said polymerization being effected in aqueous emulsion in the presence of a water-soluble salt of an inorganic per-acid, an oxidizable sulfur compound, and an emulsifying agent.

7. The process of claim 6 wherein the polymerizable compound containing conjugated double bonds is 1,3-butadiene.

8. The process of claim 6 wherein the polymerizable compound containing conjugated double bonds is 2-chloro-1,3-butadiene.

9. The process for obtaining an interpolymer of butylvinylsulfone with 1,3-butadiene, which comprises polymerizing from 15 to 60 parts by weight of butylvinylsulfone with from 85 to 40 parts by weight of 1,3-butadiene in an aqueous emulsion in the presence of potassium persulfate, sodium bisulfite and an emulsifying agent.

10. The process for obtaining an interpolymer of butylvinylsulfone with 2-chloro-1,3-butadiene, which comprises polymerizing from 15 to 60 parts by weight of butylvinylsulfone with from 85 to 40 parts by weight of 2-chloro-1,3-butadiene in an aqueous emulsion in the presence of potassium persulfate, sodium bisulfite and an emulsifying agent.

CHARLES J. MIGHTON.

REFERENCES CITED

The following references are of record in the file of this patent:

UNITED STATES PATENTS

| Number | Name | Date |
|---|---|---|
| 2,125,649 | Reppe | Aug. 2, 1938 |
| 2,163,180 | Ufer | June 20, 1939 |
| 2,201,884 | Carothers | May 21, 1940 |
| 2,388,225 | Brooks | Oct. 30, 1945 |
| 2,394,960 | Young | Feb. 12, 1946 |
| 2,395,327 | Hanford | Feb. 19, 1946 |

OTHER REFERENCES

Ramberg Arkiv for Kemi, Mineralogi och Geologi., vol. 13A, No. 27 (50 pp.) 1940. Copy in Library of the Department of Agriculture.

Certificate of Correction

June 7, 1949.

Patent No. 2,472,672.

CHARLES J. MIGHTON

It is hereby certified that error appears in the printed specification of the above numbered patent requiring correction as follows:

Column 3, line 50, Example III, for "403 C." read *40° C.*;

and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*